US008645402B1

(12) United States Patent
Gerritson et al.

(10) Patent No.: US 8,645,402 B1
(45) Date of Patent: Feb. 4, 2014

(54) MATCHING TRIP DATA TO TRANSPORTATION NETWORK DATA

(75) Inventors: Peter Gerritson, Los Angeles, CA (US); Michael W. Watzke, Madison, WI (US)

(73) Assignee: Teradata US, Inc., Dayton, OH (US)

( * ) Notice: Subject to any disclaimer, the term of this patent is extended or adjusted under 35 U.S.C. 154(b) by 565 days.

(21) Appl. No.: 12/644,240

(22) Filed: Dec. 22, 2009

(51) Int. Cl.
*G06F 17/30* (2006.01)

(52) U.S. Cl.
USPC .......................................... 707/755; 707/798

(58) Field of Classification Search
USPC ..................... 707/713, 714, 814; 455/456.1
See application file for complete search history.

(56) References Cited

U.S. PATENT DOCUMENTS

| | | | | |
|---|---|---|---|---|
| 6,208,934 | B1* | 3/2001 | Bechtolsheim et al. | 701/428 |
| 8,185,568 | B2* | 5/2012 | Rakib et al. | 708/401 |
| 2001/0020211 | A1* | 9/2001 | Takayama et al. | 701/200 |
| 2002/0087570 | A1* | 7/2002 | Jacquez et al. | 707/100 |
| 2003/0233403 | A1* | 12/2003 | Bae et al. | 709/203 |
| 2004/0167712 | A1* | 8/2004 | Plutowski | 701/209 |
| 2006/0089798 | A1* | 4/2006 | Kaufman et al. | 701/211 |
| 2006/0184314 | A1* | 8/2006 | Couckuyt et al. | 701/202 |
| 2006/0218123 | A1* | 9/2006 | Chowdhuri et al. | 707/2 |
| 2007/0104378 | A1* | 5/2007 | Aguera Y Arcas | 382/232 |
| 2008/0011509 | A1* | 1/2008 | Baliarda et al. | 174/261 |
| 2008/0248815 | A1* | 10/2008 | Busch | 455/456.5 |
| 2009/0005964 | A1* | 1/2009 | Forstall et al. | 701/201 |
| 2009/0150067 | A1* | 6/2009 | Lindman | 701/204 |
| 2009/0287407 | A1* | 11/2009 | Sheha et al. | 701/201 |
| 2010/0094496 | A1* | 4/2010 | Hershkovitz et al. | 701/22 |
| 2010/0125410 | A1* | 5/2010 | Hicks | 701/209 |
| 2010/0241289 | A1* | 9/2010 | Sandberg | 701/2 |

OTHER PUBLICATIONS

Nazari et al., An Advanced Algorithm for Finding Shortest Path in Car Navigation System, 2008, pp. 671-674.*
Kamel et al. Hilbert R-tree: An improved R-tree using fractals, Feb. 1994, pp. 1-14.*
Gavrila et al. R-tree Index Optimization, Jun. 1994, pp. 1-20.*
"Hilbert curve," http://en.wikipedia.org/wiki/Hilbert_curve, downloaded on Jul. 16, 2012, (5 pages).
"R-tree," http://en.wikipedia.orgiwiki/R_tree, downloaded on Jul. 16, 2012, (7 pages).

* cited by examiner

*Primary Examiner* — Sherief Badawi
(74) *Attorney, Agent, or Firm* — Trop, Pruner & Hu, P.C.; Randy L. Campbell, Jr.

(57) ABSTRACT

Trip data that includes points traversed during corresponding trips is received. Transportation network data that describes geographic locations and links between the geographic locations is received. The trip data and transportation network data are partitioned across a plurality of processing units executing on one or more processors. At each of the plurality of processing units, a subset of the trip data at the corresponding processing unit is locally matched to a subset of the transportation network data at the corresponding processing unit to identify a subset of paths of the transportation network data traversed by one or more of the trips.

19 Claims, 9 Drawing Sheets

MATCHING TRIP DATA TO TRANSPORTATION NETWORK DATA

BACKGROUND

For certain applications, it may be desirable to match trip data that describes trips to transportation network data that describes a network of transportation paths, such as a network of roads on a map. The trip data can include global positioning system (GPS) data that describes points along a path traversed by each trip. As an example, an automobile can collect a set of trip path points, which can be matched to a road network to determine roads that were traversed by the trip.

If a system has to perform mapping between a relatively large number of trips and road network data, a substantial processing burden is placed on the system, which can cause the mapping to be slow.

SUMMARY

In general, according to an embodiment, a method includes receiving trip data that includes points traversed during trips, and receiving transportation network data that describes geographic locations and links between geographic locations. The trip data and transportation network data are partitioned across multiple processing units executing on one or more processors. Each of the processing units locally matches a subset of the trip data to a corresponding subset of the transportation network data to identify a subset of paths of the transportation network data traversed by the trips.

Other or alternative features will become apparent from the following description, from the drawings, and from the claims.

BRIEF DESCRIPTION OF THE DRAWINGS

Some embodiments of the invention are described with respect to the following figures.

DETAILED DESCRIPTION

Figure 1:
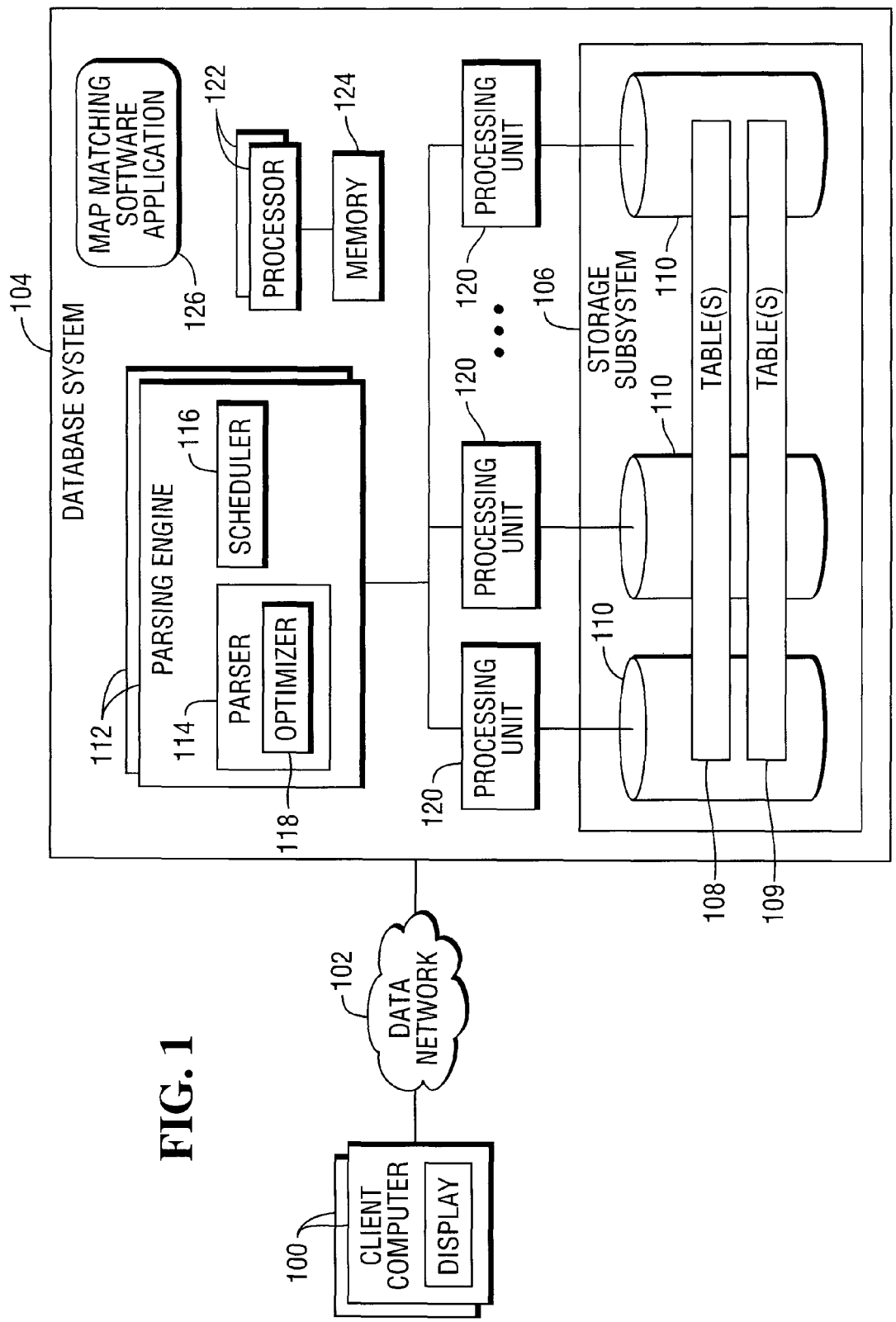
FIG. 1 is a block diagram of an example arrangement that includes a database management system that incorporates an embodiment of the invention.

In general, according to some embodiments, an improved map matching technique is provided for matching trip data that describes various trips to transportation network data that describes geographic locations and links between the geographic locations. The trip data includes a collection of points traversed during the trips. For example, the collection of points may be represented by global positioning system (GPS) data, or other data indicating geographic points.

For improved performance, the map matching technique is performed in a system that has multiple processing units. In some embodiments, the multiple processing units are processing units of a database management system that are responsible for managing access of data in one or more relational tables. The trip data and transportation network data are partitioned across the multiple processing units. At each of the processing units, local matching is performed between a subset of the trip data at the corresponding processing unit to a subset of the transportation network data at the corresponding processing unit to identify a subset of paths of the transportation network data traversed by the trips.

In some implementations, transportation network data includes a road network data that describes roads. The road network data is represented as a set of vertexes and links, where a vertex is a terminal point or an intersection point of a graph. The vertex is an abstraction of a geographic location such as a city, a road intersection, an administrative division, or a transport terminal (station, terminal, harbor, airport, etc.). A link is connected between two vertexes, where the link is an abstraction of a transport infrastructure supporting movements between the vertexes. A link can have an associated direction to indicate the direction of movement. A link can also be bi-directional.

A vertex is represented by a vertex entity that can have the following attributes, according to an example: a vertex identifier, a vertex name, a vertex description, and a vertex geometry (which is a geometric object representing the location of the vertex). A link is represented by a link entity, which can have the following attributes according to an example: link identifier, link name, link description, link geometry (a geometric object representing the location of the link), starting vertex (an identifier of the vertex that is at the start of the link), and ending vertex (an identifier of the vertex at the end of the link).

A map matching technique according to some embodiments is performed based on a comparison of the trip data and the transportation network data. The goal of the map matching technique is to identify a set of transportation network links and vertexes that describe trips under consideration.

Note that map matching can be performed in either an online or offline manner. Online map matching occurs in real time, such as in a car navigation system where the user is continually interacting with the car navigation system to identify desired paths. Offline map matching occurs after data collection, such as for a pay-as-you-drive billing process or some other application.

The trip data, which can represent one trip or multiple trips, can occupy a particular geographic space. This geographic space may represent a city, a state, a country, a continent, or the entire world. In some applications, there can be a relatively large amount of trip data (representing a relatively large number of trips) that has to be matched to the transportation network data, which is processing intensive. As noted above, for improved performance, the trip data and transportation network data are partitioned across multiple processing units of a system to perform local matching at each of the processing units to identify corresponding subsets of paths traversed by the trips represented by the trip data.

FIG. 1 illustrates an example arrangement in which a client station (or plural client stations) 100 is (are) coupled to a database management system 104 over a data network 102. Examples of the data network 102 include a local area network (LAN), a wide area network (WAN), the Internet, and so forth. Each client station 100 is capable of issuing queries according to a standard database query language to the database management system 104 to access or update data or to create or alter data structures (e.g., tables, databases, views, and so forth). One example of a standard database query language is SQL (Structured Query Language), as promulgated by the American National Standards Institute (ANSI).

The database management system 104 includes a storage subsystem 106 that stores various data, including relational tables 108. Each relational table 108 contains rows and columns. The storage subsystem 106 includes plural storage modules 110, which can be physical storage devices or logical representations of partitions of the storage subsystem 106.

The database management system 104 also includes one or more parsing engines 112, each having a parser 114 and a scheduler 116. The parser 114 receives database queries (such as those submitted by the client stations 100), parses each received query, and generates executable steps for the parsed query. The parser 114 includes an optimizer 118 that generates query plans in response to a query, selecting the most efficient from among the plural query plans. The scheduler 116 sends the executable steps generated by the parser 114 to multiple processing units 120 in the database system 104.

In some implementations, each processing unit 120 can perform the following tasks: inserts, deletes, or modifies contents of tables; creates, modifies, or deletes definitions of tables; retrieves information from definitions and tables; and locks databases and tables. In one example, each processing unit 120 is based on an access module processor (AMP) used in some TERADATA® database systems from Teradata Corporation. Each processing unit 120 manages access of data in respective storage modules 110. The presence of multiple processing units 120 and corresponding storage modules 110 define a parallel database management system.

In addition, map matching features according to some embodiments are incorporated in the database management system 104 of FIG. 1. As noted above, map matching involves partitioning trip data and transportation network data across multiple processing units 120, each of is configured to perform local matching between a subset of the trip data and a corresponding subset of the transportation network data. The trip data and transportation network data can be contained in respective relational tables 108, 109 stored in respective storage modules 110.

The database management system 104 also includes a map matching software application 126 that is able to manage the map matching process. For example, the map matching software application 126 is executable to submit requests to perform the map matching at the processing units 120. Also, the map matching software application 126 is able to provide an output of the map matching, such as at a display device or as an output communicated over a network.

The processing units 120 and parsing engine(s) 112 are part of database software executable in the database management system 104. The database software and the map matching application software 126 are executable on one or more processors 122 of the database management system 104. The processor(s) 122 is (are) connected to a memory 124.

In the example of FIG. 1, the components of the database management system 104 are depicted as being part of one computer node. Note that the database management system 104 can actually be implemented in a multi-node system, where each of the computer nodes contains one or more processing units 120 and parsing engines 112 (and corresponding one or more processors 122) to provide a distributed database architecture.

The memory 124 can be implemented with one or more memory devices, such as the random access memories (DRAMs), flash memories, or other types of semiconductor or integrated circuit memory devices. Alternatively, the memory 124 can be implemented using disk-based storage that has higher access speeds than the storage media used to implement the storage subsystem 106.

Although the map matching technique according to some embodiments is described in the context of being performed in the database management system 104, it is noted that in alternative embodiments, the map matching technique can be performed in another type of system.

Figure 2:
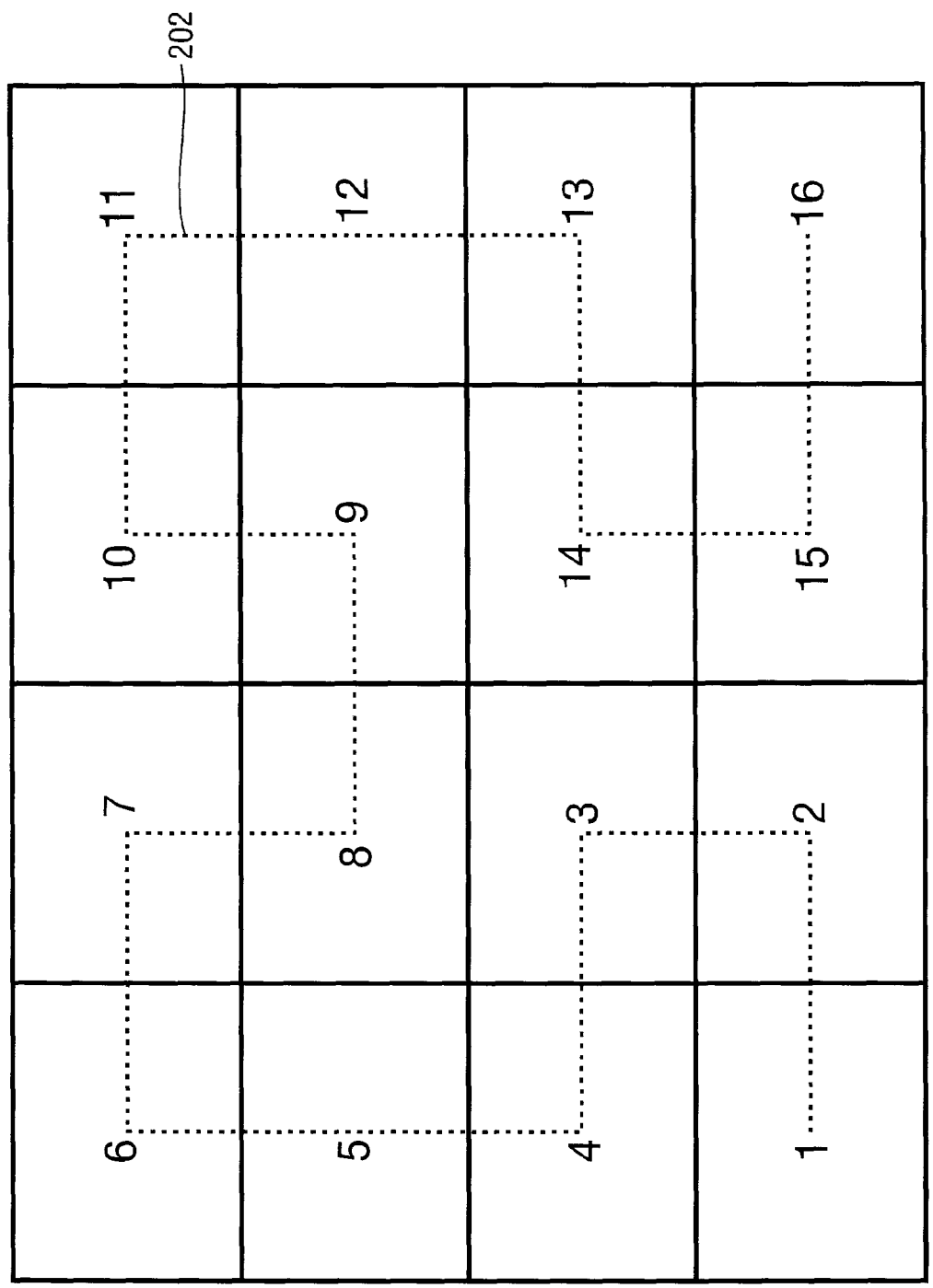
FIG. 2 illustrates an example Hilbert filling curve that fills a particular geographic space that contains trip data of interest, according to an embodiment.

In one embodiment, trip data can be organized according to a Hilbert space filling curve. The Hilbert space filling curve defines a space filling curve in a particular geographic space that is occupied by the trip data. The Hilbert space filling curve is produced by applying a Hilbert transform. An example of a Hilbert space filling curve is depicted in FIG. 2, where the Hilbert space filling curve is represented by curve 202. The Hilbert space filling curve visits each of an array of cells (16 cells are depicted in the example of FIG. 2). Thus, the particular geographic space occupied by the trip data is divided into the array of cells shown in FIG. 2. Each of the cells is identified by a corresponding Hilbert code (Hcode).

Figure 3:
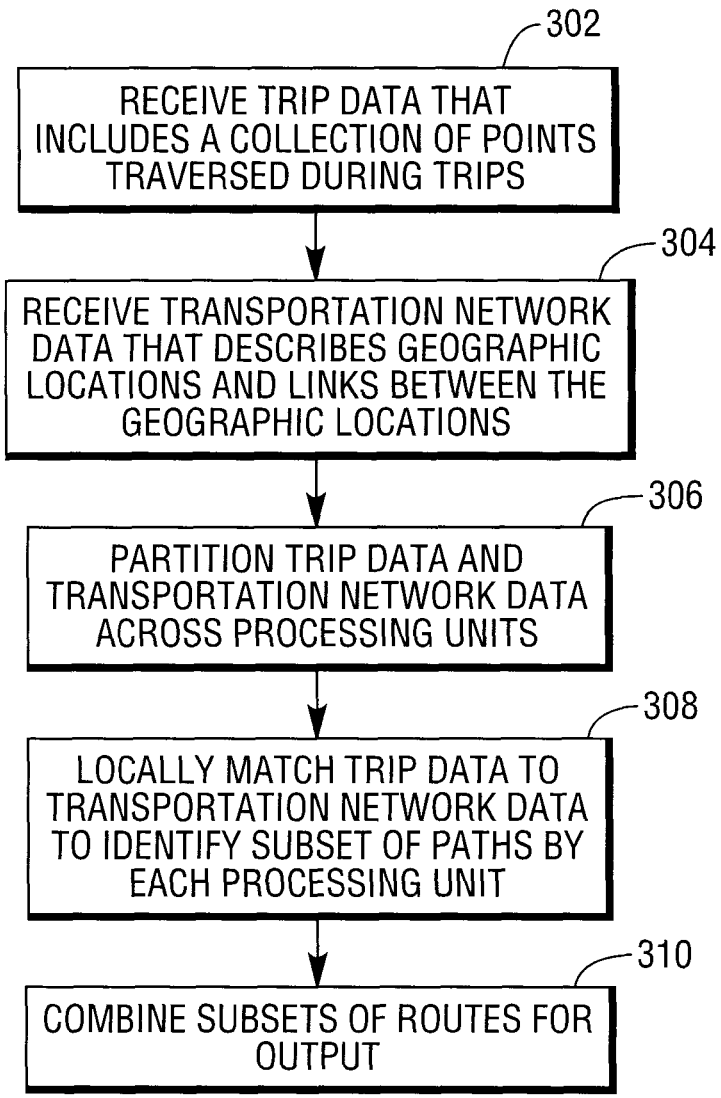
FIG. 3 is a flow diagram of a process of performing map matching, according to an embodiment.

FIG. 3 is a flow diagram of a general process according to an embodiment. The process of FIG. 3 can be performed by software executable in the database management system 104 of FIG. 1, for example. Trip data that includes a collection of points traversed during various trips is received (at 302). Note that different portions of the trip data may reside in different cells, as depicted in FIG. 2. Thus, the trip data can be organized according to the Hcodes of the cells, which can be used for partitioning as discussed further below.

In addition, transportation network data that describes geographic locations and links between the geographic locations is received (at 304). In one example, the transportation network data includes road network data that identifies roads.

The transportation network data can be indexed using an Rtree, or other tree-based index. The organization of the transportation network data into the Rtree can be based on an Rtree Hilbert packing algorithm, in which the various tree nodes of the Rtree are associated with the ranges of Hcodes.

The trip data and transportation network data are partitioned (at 306) across the multiple processing units 120 of the database management system 104. The partitioning of the transportation network data involves partitioning the transportation network index (the Rtree discussed above), where the partitioning of such Rtree can be based on the Hcodes contained within the corresponding tree nodes of the Rtree. The trip data is also partitioned according to the Hcodes.

After partitioning of the trip data and the transportation network data across processing units, local matching of the trip data to transportation network data can be performed (at 308). The local matching involves matching a subset of the trip data maintained at the corresponding processing unit to a subset of the transportation network data maintained at the corresponding processing unit to identify a subset of paths traversed by the trips.

Next, the subsets of paths identified by the processing units are combined (at 310) for output. The identified paths for the trips indicate the best fit paths traversed by the trips.

Figure 4:
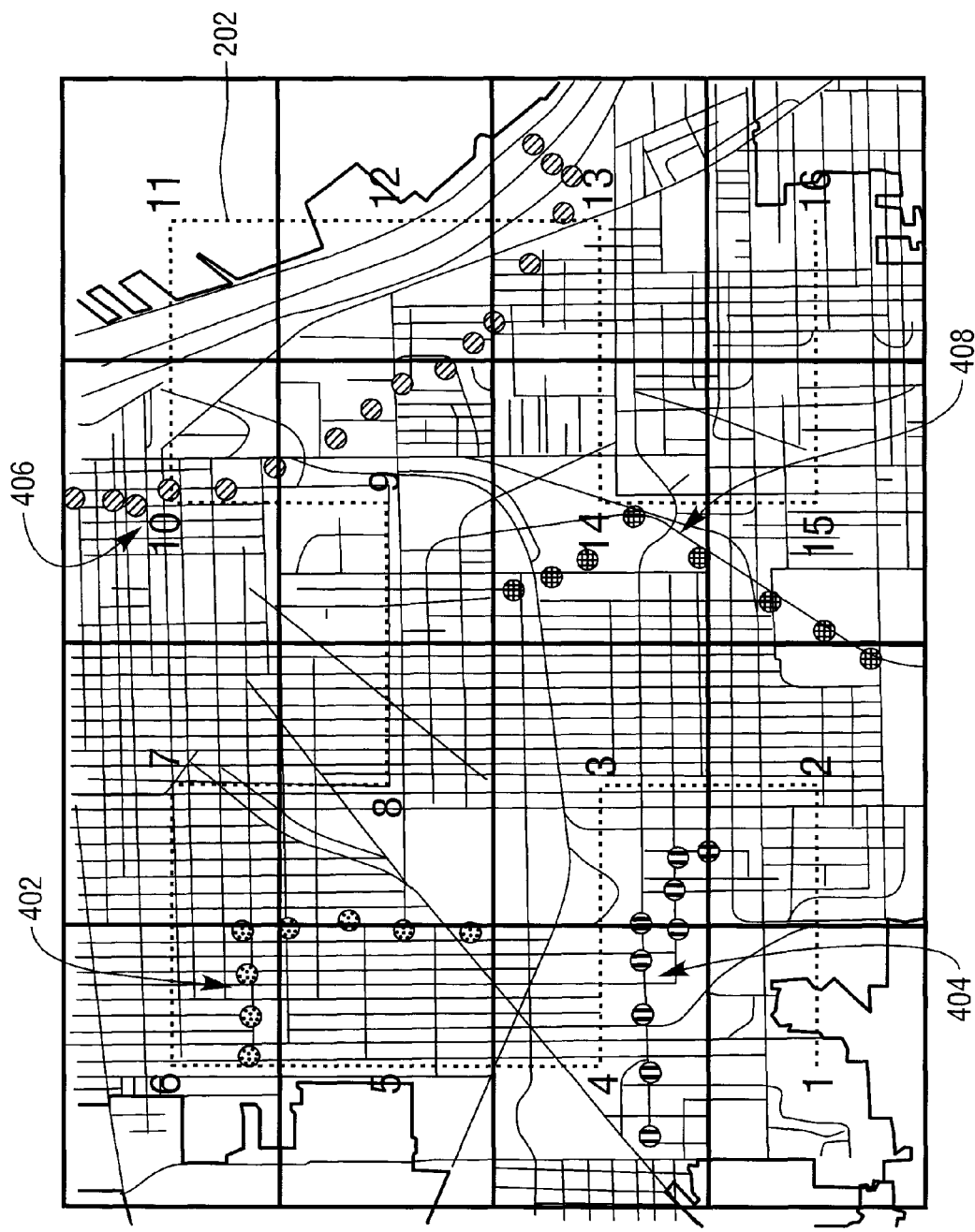
FIG. 4 illustrates multiple trip data objects overlaid onto a map, against which a map matching process according to an embodiment can be applied.

FIG. 4 illustrates an example that combines the cells and Hilbert space filling curve 202 of FIG. 2 with trip data and transportation network data. In FIG. 4, the transportation network data is a portion of a map that contains various roads. The trip data contains trip data associated with four trips, represented by four collections (402, 404, 406, and 408) of points (represented by small circles with different patterns inside).

To more efficiently match the trip data of FIG. 4 with the transportation network data of FIG. 4, the subset of the trip data associated with each respective one of the four trips can be partitioned to a corresponding different processing unit. For example, the collection 402 of points corresponding to one of the trips can be partitioned to a particular processing unit. Note that the collection 402 of points occupy a subspace corresponding to Hcodes 5, 6, 7, and 8. A subset of the transportation network data that corresponds to Hcodes 5, 6, 7, and 8 can also be partitioned to the particular processing unit, as further discussed below, such that local matching between the subsets of the trip data and the transportation network data can be performed.

Figure 5:
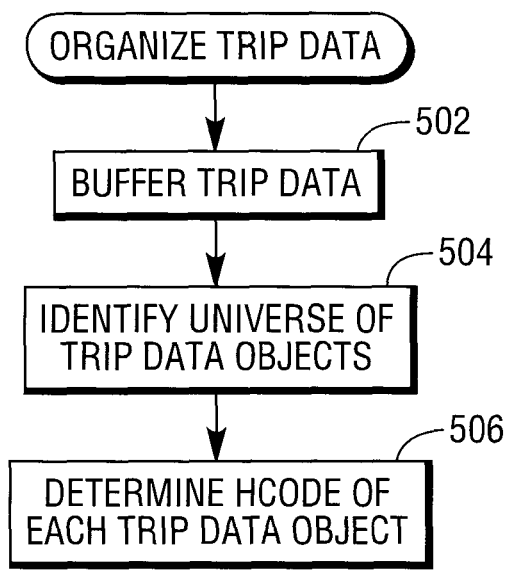
FIG. 5 is a flow diagram of a process of organizing trip data, according to an embodiment.

FIG. 5 is a flow diagram of a process of organizing trip data (the trip data received at 302 in FIG. 3). The trip data includes multiple trip data objects, where each trip data object represents a corresponding trip. Thus, for example, the four collections 402, 404, 406, and 408 of points shown in FIG. 4 are contained in four corresponding trip data objects. Each trip data object is buffered (at 502) to achieve a desired map matching error tolerance. Note that location data (e.g., GPS data) of each trip data object may not be completely accurate, such that a buffer region is added to either side of a line that represents a path taken by a trip. For example, the buffer region can be 30 feet on either side of the line that passes through the points of each of collections 402, 404, 406, or 408.

The universe of trip data objects is identified (at 504). Note that this universe of trip data objects occupies the particular geographic space depicted in FIG. 2. In the example of FIG. 4, the universe of trip data objects include the trip data objects containing respective collections 402, 404, 406, and 408 of points traversed by four corresponding trips.

An Hcode is then associated (at 506) with each trip data object. This can be accomplished, for example, by identifying a centroid of each trip data object, and identifying the cell (one of the 16 cells shown in FIG. 2 or 4) of the trip data object centroid. Such cell is associated with a corresponding Hcode, which is assigned to the trip data object.

Figure 6:
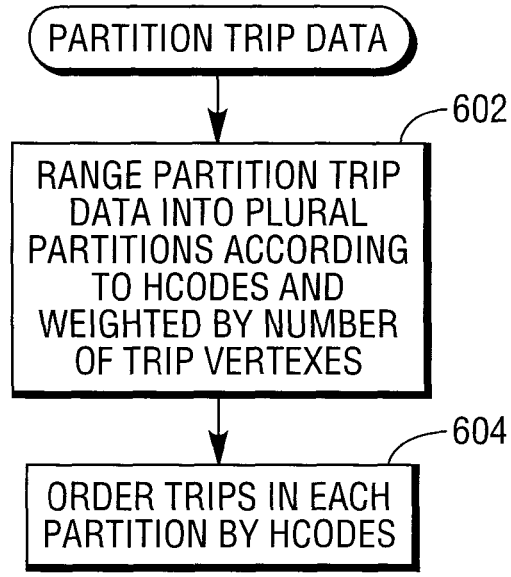
FIG. 6 is a flow diagram of a process of partitioning the trip data, according to an embodiment.

FIG. 6 shows partitioning of the trip data. In some embodiments, the trip data is range partitioned (at 602). A number (p) of partitions is identified, where p≥1. A single trip data object will not be split across partitions; in other words, each trip data object is contained within a singe partition. Each trip is assigned to a partition based on quantiling of order p of the Hcode weighted by the number of vertexes of each trip data object, where a vertex represents a geographic point (such as each circle shown in FIG. 4). Conceptually, this means that the Hcode values for each trip are repeated once for each vertex of the trip, and then quantiled. The goal is to provide partitions that each includes substantially the same number of trip vertexes, such that no one partition is more heavily loaded than another partition.

The partitioned ranges are then determined by the minimum and maximum of the Hcodes for each quantile. For example, the following can be an example of Hcodes contained within each partition:

Partition 1:=Hcodes 1-4 (corresponding to collection 404 in FIG. 4);
Partition 2:=Hcodes 5-8 (corresponding to collection 406 in FIG. 4);
Partition 3:=Hcodes 9-12 (corresponding to collection 406 in FIG. 4);
Partition 4:=Hcodes 13-16 (corresponding to collection 408 in FIG. 4).

One or more of the partitions can include multiple trip data objects. Within each partition, the trip data objects are ordered by trip Hcode (at 604).

Figure 7:
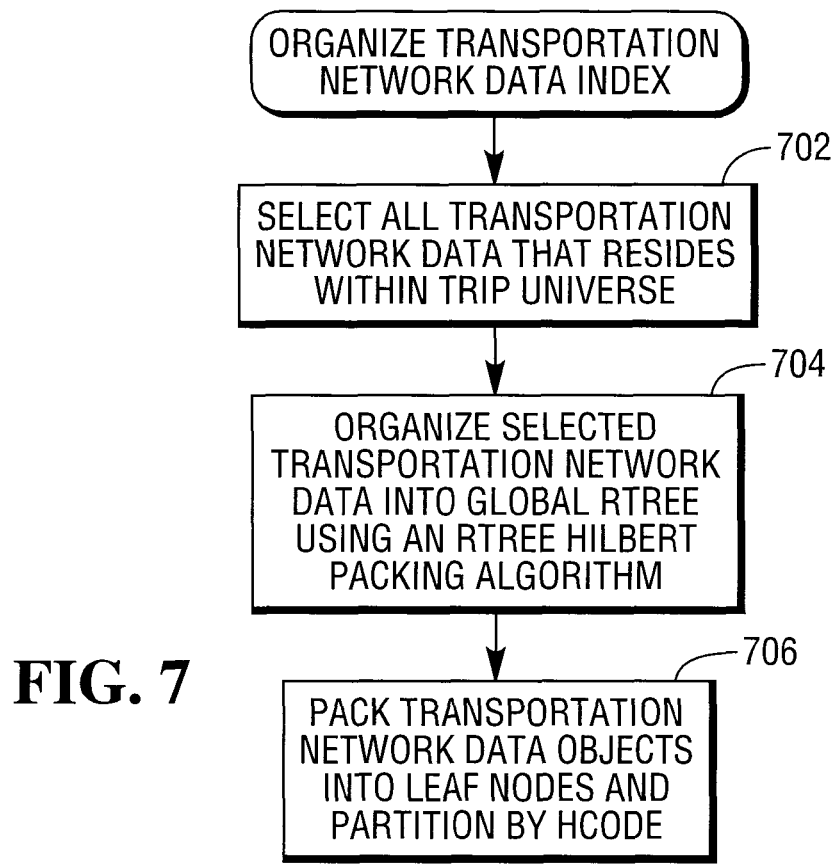
FIG. 7 is a flow diagram of organizing a transportation network data index, according to an embodiment.

FIG. 7 illustrates a flow diagram of a process of organizing a transportation network data index, according to an embodiment. All transportation network data that resides within the trip universe is selected (at 702). The trip universe refers to the identified universe of trip data objects that was identified at 504 in FIG. 5.

Figure 8:
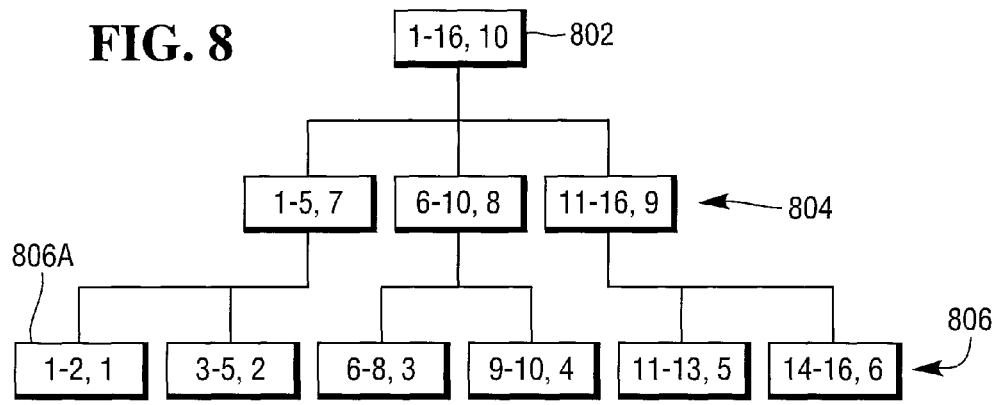
FIG. 8 illustrates a Hilbert packed Rtree for representing an index of the transportation network data, according to an embodiment.

The selected transportation network data is organized (at 704) into a global Rtree index (a single Rtree index structure with nodes distributed across the units of parallelism), using an Rtree Hilbert packing algorithm. An example Hilbert packed Rtree is shown in FIG. 8, which depicts a root node 802, intermediate (directory) nodes 804, and leaf nodes 806. Each of the nodes of the Rtree is referred to as a tree node, and each tree node is associated with a range of Hcodes (such as Hcodes 1-2 in leaf node 806A). Each tree node is also associated with a tree node identifier, such as tree node identifier 1 in leaf node 806A. The other tree nodes in FIG. 8 are similarly associated with corresponding Hcode ranges and tree node identifiers.

In organizing the transportation network data index, actual transportation network data objects may be packed (at 706) into the leaf nodes 806, and such leaf nodes are partitioned by Hcode. The transportation network data objects are sorted based on Hcodes of respective centroids (discussed above) into leaf nodes of size N. In one implementation, leaf node identifiers are set to the current packing value, which is input cardinality divided by N.

In one example, each leaf node has the following entry: node identifier, Hcode range, [object identifier, MBR], where MBR stands for "minimum bounding rectangle." The MBR defines the smallest rectangle that contains the content of the corresponding leaf node. When a tree node is cached in memory, a pointer field is added to each entry to record the memory location.

In one example, each directory node (nodes of the Rtree other than the leaf nodes) includes the following entry: node identifier, Hcode range, [child node identifier, MBR].

Figure 9:
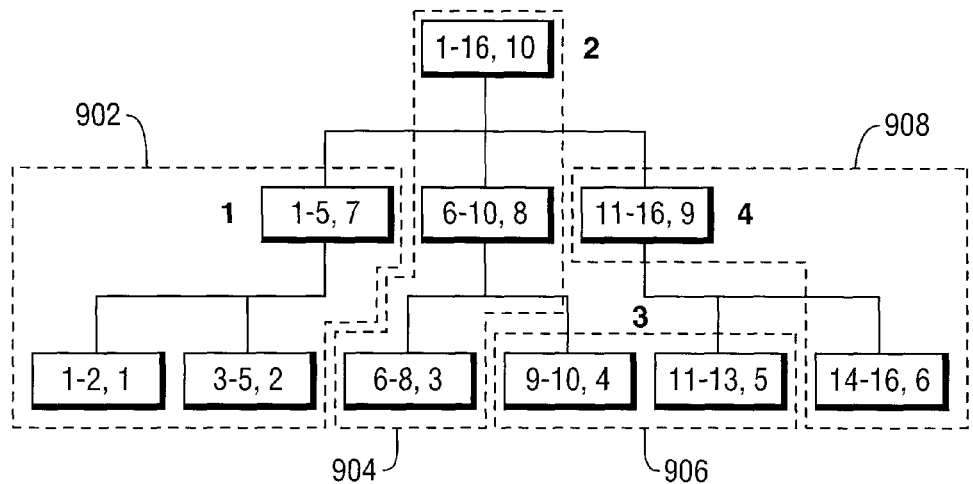
FIG. 9 illustrates partitioning of the Rtree, according to an embodiment.

In one implementation, the partitioning of the Rtree at 706 is based on median values of Hcodes contained within each tree node. The partitioning ranges are discussed above in connection with task 602 in FIG. 6. An example partitioning of the Rtree is shown in FIG. 9, which shows four partitions 902, 904, 906, and 908. These partitions correspond to the same partitions of trip data objects discussed above in connection with FIG. 6.

In addition to partitioning the transportation network data index, the transportation network data itself can also be partitioned. The selected transportation network data (selected at 702 in FIG. 7) is partitioned across the partitions according to their ranges defined in FIG. 6. Note that the partitioning of the transportation network data can be performed lazily on an as needed basis. Alternatively, the partitioning can be performed ahead of time.

Figure 10:
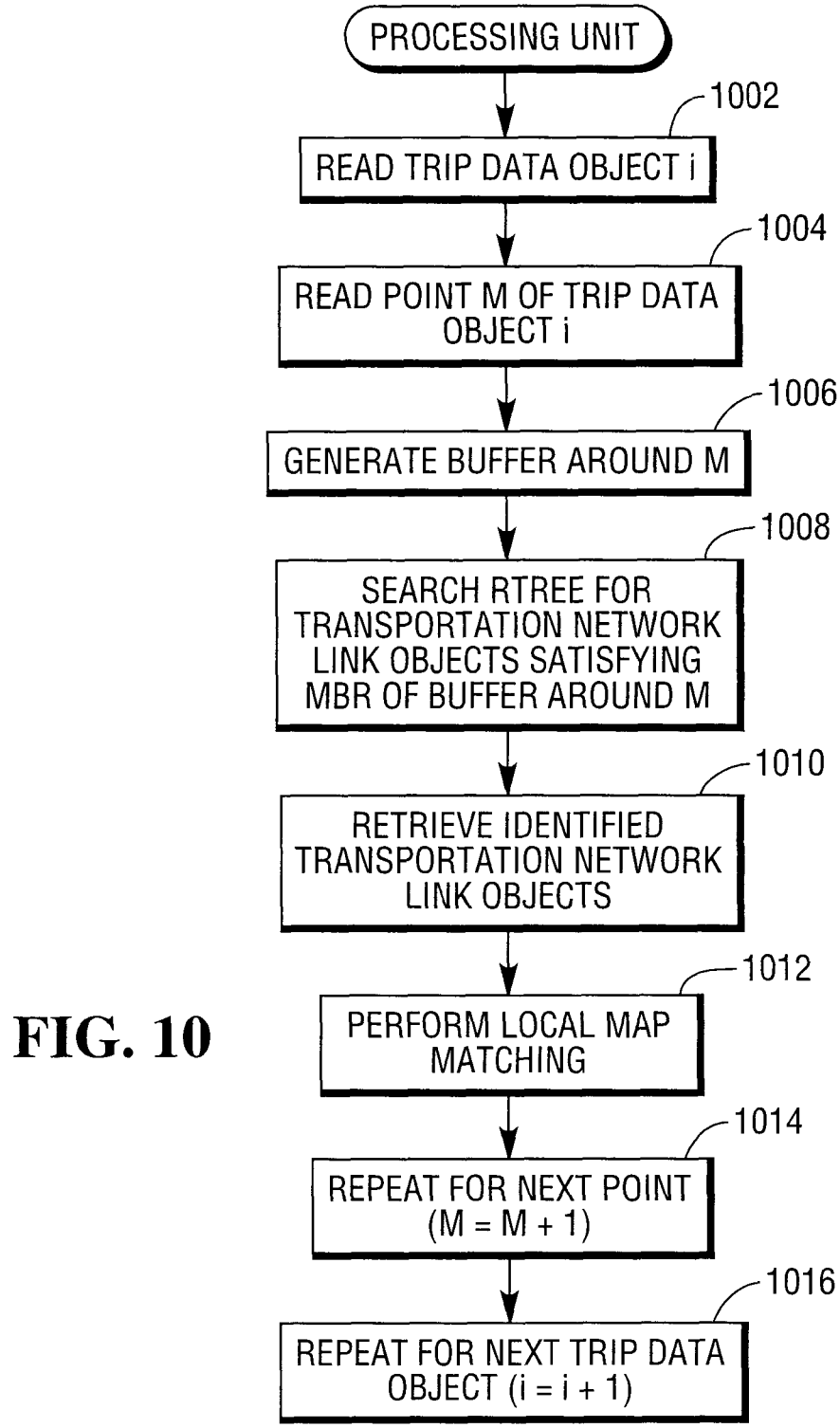
FIG. 10 is a flow diagram of a process local map matching performed by a processing unit, according to an embodiment.
Figure 11:
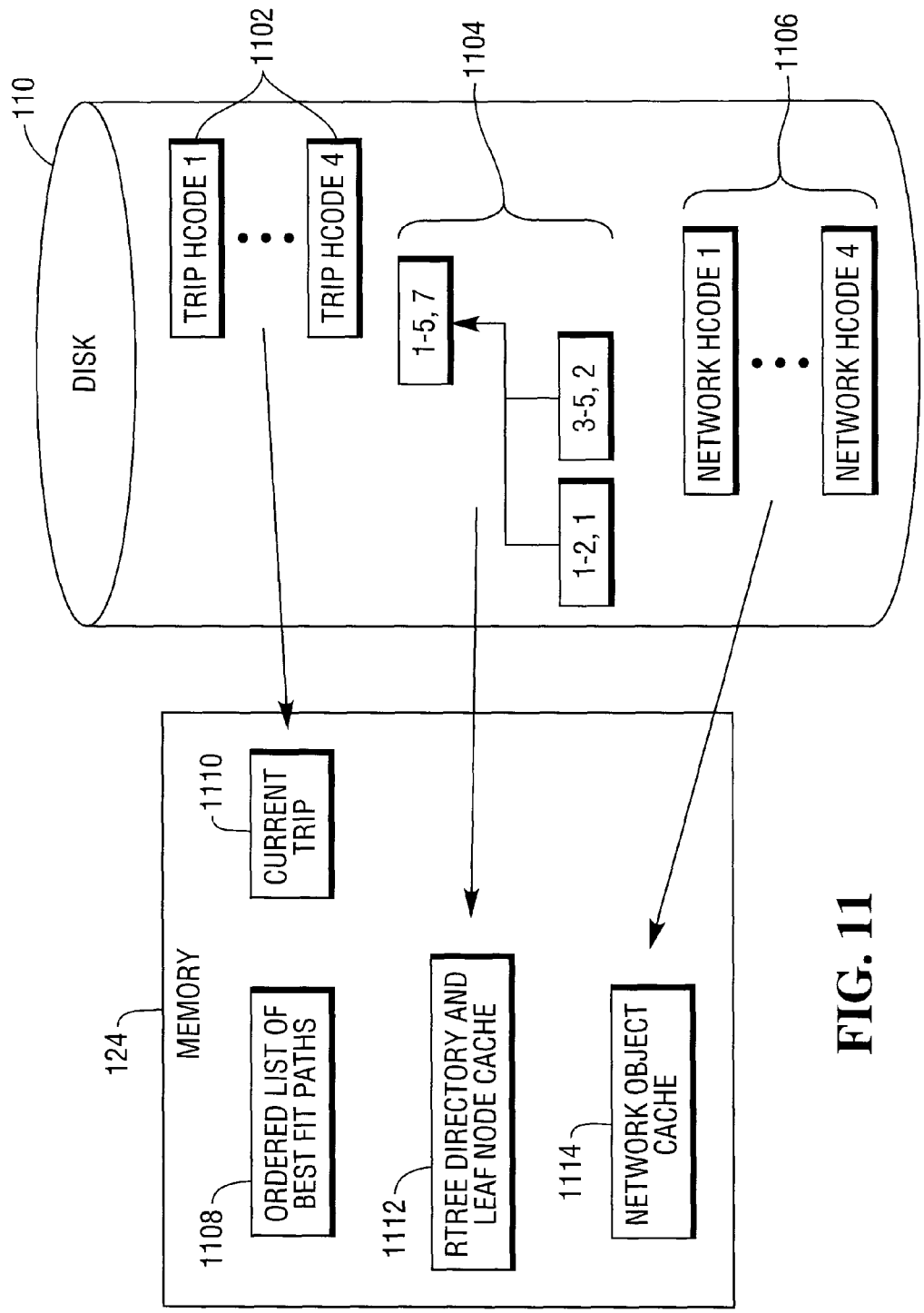
FIG. 11 is a schematic diagram of a memory and storage module containing data for performing the local map matching of FIG. 10, according to an embodiment.

The following discussion refers to both FIGS. 10 and 11. FIG. 10 depicts a process of matching trip data to transportation network data in a system having multiple processing units, in accordance with an embodiment. The flow of FIG. 10 is performed at each unit of parallelism, which in the example system of FIG. 1 is a processing unit 120. The processing unit that performs the flow of FIG. 10 is referred to as the "local" processing unit.

FIG. 11 depicts a storage module 110 associated with the local processing unit. It is assumed in this example that the storage module 110 is a disk. The memory associated with the local processing unit is represented as 124.

The local processing unit reads (at 1002) trip data object i that is part of the partition corresponding to the local processing unit. In FIG. 11, the trip data object i retrieved into the memory 124 is represented as "current trip 1110." The current trip 1110 is one of the trip data objects 1102 stored in the storage module 110.

The value of the variable i is set to an initial value corresponding to the first trip data object that corresponds to the processing unit. Note that there may be just one trip data object or multiple trip data objects associated with the local processing unit.

In trip data object i, the local processing unit reads (at 1004) point M (such as a point represented by one of the circles in FIG. 4). A buffer is then generated (at 1006) around point M. The buffer can have some configurable size, as specified by a user or application for example.

Next, the local processing unit searches (at 1008) the transportation network data index (e.g., Rtree) to identify transportation network link objects that satisfy a region (e.g., MBR) of the buffer around point M. In this example, the MBR of the buffer around point M is considered a search criterion for finding transportation network link objects located within such MBR.

For enhanced efficiency, the root node (e.g., 802 in FIG. 8) of the Rtree is cached in memory in all the partitions. Initially, the root node will be read from the owning processing unit (e.g., processing unit corresponding to partition 904 in FIG. 9), which may result in a remote read operation across an interconnect between processing units.

Directory nodes (non-leaf nodes) of the Rtree are cached in memory associated with the local processing unit based on a least recently used (LRU) replacement algorithm, or some other replacement algorithm. In other words, if space is needed in the memory of the local processing unit for additional directory nodes, the LRU algorithm specifies that the least recently used directory nodes in the memory are replaced.

Leaf nodes can also be cached based on LRU, in some implementations. Because Rtree nodes are partitioned by Hcode, there is a relatively high likelihood that non-cached Rtree nodes (represented as 1104 in FIG. 11) will be read from the storage module 110 associated with the local processing unit, such that a remote read of data from a remote processing unit would not be needed. The Rtree nodes are stored in the Rtree directory and leaf node cache 1112.

The transportation network link objects that were identified as part of the search (1008) are retrieved (at 1010) using object identifiers obtained from the Rtree leaf nodes. The retrieved transportation network link objects can be cached in a network object cache 1114 in the memory 124, where the caching can be according to LRU in one example. Because the transportation network link data is partitioned by Hcode, there is a relatively high likelihood that non-cached transportation network link objects will be read from the local storage module associated with the local processing unit, rather than read from a remote storage module associated with a remote processing unit.

Next, local map matching is performed (at 1012) by the local processing unit. If M=1, then a best fit path list (1108 in FIG. 11) (that lists the best paths corresponding to a particular trip) is set to NULL (empty result). The list is sorted by cumulative distance between a trip point and transportation network link data objects.

In the local map matching, for each selected transportation network link data object, a distance to the current trip point M is calculated. If the selected transportation network link data object is connected to a path in the best fit list, then the link is added to the path. Otherwise, a new path is started.

The process (tasks 1002 to 1012) above is repeated (at 1014) for the next point M in the trip data object i. After all points M have been considered for a trip data object i, then the next trip data object i in the local partition is considered (at 1016) and the tasks 1002 to 1014 are repeated.

Instructions of software described above (including the map matching software application 126 and processing units 120 of FIG. 1) are loaded for execution on a processor (such as one or more processors 122 in FIG. 1). The processors include microprocessors, microcontrollers, processor modules or subsystems (including one or more microprocessors or microcontrollers), or other control or computing devices. As used here, a "processor" can refer to a single component or to plural components (e.g., one CPU or multiple CPUs).

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method comprising:
  receiving trip data that includes points representative of geographic locations traversed during a plurality of corresponding independently-traversed separate trips;
  storing the trip data in a storage device;
  retrieving the stored trip data from the storage device;
  determining a particular geographic space occupied by the trip data;
  receiving transportation network data that describes geographic locations and links between the geographic locations of the transportation network data;
  partitioning the stored trip data and transportation network data across a plurality of processing units executing on one or more processors, wherein the stored trip data is partitioned into subsets, wherein each subset of stored trip data is a respective one of the corresponding independently-traversed separate trips, and wherein the transportation network data is partitioned into subsets, and wherein each subset of transportation network data includes geographic space data containing a corresponding one of the independently-traversed separate trips from the stored trip data; and organizing the stored trip data according to a predetermined function;

at each of the plurality of processing units executing on the one or more processors, locally matching a subset of the stored trip data to a corresponding subset of the transportation network data to identify a subset of paths of the transportation network data traversed by each subset of stored trip data.

2. The method of claim 1, further comprising:

combining the subsets of paths identified by the plurality of processing units to provide an output that identifies all paths traversed by the plurality of independently-traversed separate trips.

3. The method of claim 1, organizing the stored trip data according to the predetermined function comprises organizing the trip data according to a Hilbert space filling curve that defines a space filling curve in a particular geographic space, wherein the particular geographic space is divided into cells including corresponding different portions of the space filling curve, wherein each of the cells is identified by a corresponding Hilbert code.

4. The method of claim 3, wherein partitioning the trip data comprises range partitioning the trip data by the Hilbert codes.

5. The method of claim 4, further comprising organizing the transportation network data into an global Rtree having a hierarchical arrangement of tree nodes, wherein each of the tree nodes contains a range of Hilbert codes and a corresponding tree node identifier.

6. The method of claim 5, wherein partitioning the transportation network data across the plurality of processing units comprises partitioning the tree nodes of the Rtree.

7. The method of claim 6, wherein partitioning the transportation network data comprises range partitioning the Rtree according to a corresponding median value of Hilbert codes contained in each tree node.

8. The method of claim 6, wherein locally matching comprises:

at each of the processing units, searching the Rtree to identify the subset of the transportation network data to retrieve to locally match to the corresponding subset of the trip data at the processing unit.

9. The method of claim 1, wherein local matching is performed by each of the plurality of processing units that are part of a database management system, wherein the processing units are configured to manage access of one or more relational tables in the database management system.

10. An article comprising at least one non-transitory storage medium storing instructions that upon execution by at least one processor causes the at least one processor to:

receive trip data that includes points representative of geographic locations traversed during a plurality of corresponding independently-traversed separate trips;

store the trip data in a storage device;

retrieve the stored trip data from the storage device;

determine a particular geographic space occupied by the trip data;

identify transportation network data that describes geographic locations and links between the geographic locations of the transportation network data;

provide an index representing transportation network data, wherein the transportation network data comprises geographic space data;

partition the stored trip data and the index across a plurality of processing units, wherein each stored trip data partition includes stored trip data for at least one independently-traversed separate trip, and wherein each index partition is associated with a subset of transportation network data corresponding to at least one of the independently-traversed separate trips;

organize the stored trip data according to a predetermined function; and use, at each of the plurality of processing units, the index to identify a corresponding subset of the transportation network data to locally match to the stored trip data to identify a subset of paths of the transportation network data traversed by each subset of stored trip data.

11. The article of claim 10, wherein, upon execution of the instructions, the processor is further caused to:

provide an index having plural levels of tree nodes; and partition the index through identification of subsets of the tree nodes and assignment of the subsets to respective ones of the processing units.

12. The article of claim 11, wherein the tree nodes include leaf nodes that are assigned respective ranges of Hilbert codes, and wherein organization of the stored trip data comprises assignment of Hilbert codes to trip data objects containing respective subsets of trip data.

13. The article of claim 12, wherein organization of the stored trip data is performed in accordance to a Hilbert space filling curve that defines a space filling curve in a particular geographic space, wherein the particular geographic space is divided into cells including corresponding different portions of the space filling curve, wherein each of the cells is identified by a corresponding Hilbert code.

14. The article of claim 13, wherein, upon execution of the instructions, the processor is further caused to partition the stored trip data according to the Hilbert codes and numbers of vertexes of each trip data object, where each vertex represents a geographic point.

15. The article of claim 14, wherein, upon execution of the instructions, the processor is further caused to partition the trip data objects into plural partitions, wherein at least a particular one of the plural partitions includes multiple ones of the trip data objects, wherein the multiple trip data objects in the particular partition are sorted by corresponding Hilbert codes.

16. The article of claim 15, wherein, upon execution of the instructions, the processor is further caused to sequentially locally match the multiple trip data objects to the transportation network data in order.

17. The article of claim 14, wherein, upon execution of the instructions, the processor is further caused to partition the index according to Hilbert codes.

18. A database management system comprising:

a storage subsystem having a plurality of storage modules;

a memory;

one or more processors;

a plurality of processing units executable on the one or more processors to access data in the respective storage modules, wherein each of the plurality of processing units is executable to further:

retrieve trip data that represents a plurality of independently-traversed separate trips from one or more of the storage modules into the memory, wherein the trip data is partitioned into plural partitions, wherein each plural partition corresponds to one of the independently-traversed separate trips;

retrieve a plurality of subsets of transportation network data associated with the first partition into the memory, wherein each subset of transportation network data is associated with one of the includes geographic space data that corresponds to one of the independently-traversed separate trips; and organize the trip data according to a predetermined function locally match the trip data representing each of the independently-traversed separate trips to the associated subset of transportation network data to identify paths from the transportation network data traversed by each of the independently-traversed separate trips.

19. The database management system of claim 18, wherein the transportation network data is represented by an index partitioned into the plural partitions.

* * * * *